US006264015B1

United States Patent
De Kock

(10) Patent No.: US 6,264,015 B1
(45) Date of Patent: Jul. 24, 2001

(54) CONTINUOUSLY VARIABLE SINGLE-TUBE SHOCK ABSORBER WITH BIDIRECTIONAL CONTROL VALVE

(75) Inventor: Cornelis De Kock, Zonnemaire (NL)

(73) Assignee: Koni B. V. (NL)

( * ) Notice: Subject to any disclaimer, the term of this patent is extended or adjusted under 35 U.S.C. 154(b) by 0 days.

(21) Appl. No.: 09/125,659

(22) PCT Filed: Feb. 4, 1997

(86) PCT No.: PCT/NL97/00031

§ 371 Date: Dec. 18, 1998

§ 102(e) Date: Dec. 18, 1998

(87) PCT Pub. No.: WO97/31197

PCT Pub. Date: Aug. 28, 1997

(30) Foreign Application Priority Data

Feb. 22, 1996 (NL) .................................................. 1002426

(51) Int. Cl.[7] .......................................................... F16F 9/56
(52) U.S. Cl. .................................... 188/282.8; 188/282.5; 188/282.6
(58) Field of Search .............................. 188/284, 282.5, 188/282.6, 282.8, 313, 316, 322.13, 322.15, 322.12

(56) References Cited

U.S. PATENT DOCUMENTS

| 2,431,966 | 12/1947 | Rossman . | |
|---|---|---|---|
| 4,515,252 | * 5/1985 | Hidaka et al. | 188/282 |
| 5,690,195 | * 11/1997 | Kruckemeyer et al. | 188/299 |
| 5,823,306 | * 10/1998 | de Molina | 188/322.15 |

FOREIGN PATENT DOCUMENTS

| 553353 | 7/1974 | (CH) . |
|---|---|---|
| 0499183 | 8/1992 | (EP) . |
| 0572040 | 12/1993 | (EP) . |
| 567367 | 2/1945 | (GB) . |
| 2222227 | 2/1990 | (GB) . |
| 8909891 | 10/1989 | (WO) . |

OTHER PUBLICATIONS

Patent Abstracts of Japan, vol. 95, No. 012 & JP 07 332425A (Tokico Ltd), Dec. 22, 1995.
Patent Abstracts of Japan, vol. 015, No. 039 (M–1075), Jan. 30, 1991 & JP 02 278026A (Tokico Ltd) Nov. 14, 1990.

* cited by examiner

Primary Examiner—Robert J. Oberleitner
Assistant Examiner—Xuan Lan Nguyen
(74) Attorney, Agent, or Firm—Bachman & LaPointe, P.C.

(57) ABSTRACT

A continuously variable single-tube shock absorber operating according to the skyhook principle and having bidirectional control valves comprising a working cylinder, a piston with piston rod which is movable therein, openings cut out in the piston, spring-loaded shock absorber valves, fitted on either side of the piston, in order to shut off the openings until a certain fluid pressure has been reached, exciting chambers fitted on either side of the piston and each bounded by a stationary disc, a piston skirt which can be slid around such a disc, and a spring-loaded shock absorber valve. The exciting chambers are in communication with a bore in which the pressure is controlled by a control mechanism. Bores through which fluid can flow into the exciting chambers are provided in the stationary discs. The control mechanism can consist of a movable mass which is fitted in a spring-loaded manner and controls the passage of fluid to a bore which is in communication with the exciting chambers, or it can consist of valves to be adjusted by a coil.

8 Claims, 4 Drawing Sheets

CONTINUOUSLY VARIABLE SINGLE-TUBE SHOCK ABSORBER WITH BIDIRECTIONAL CONTROL VALVE

BACKGROUND OF THE INVENTION

The invention relates to a continuously variable single-tube shock absorber with bidirectional control valves, comprising:

a working cylinder, a piston which is connected to a piston rod and is movable in the working cylinder, openings cut out in the piston, spring-loaded shock absorber valves fitted on either side of the piston, in order to shut off said openings until a certain fluid pressure has been reached.

The object is to provide such a shock absorber operating according to the skyhook principle, in the case of which the body of a car equipped with such shock absorbers is virtually unaffected by the road aid, as it were, hangs from an imaginary fixed point above the road. Another object is to design the shock absorber in such a way that a proportional continuous adjustment is possible and that—unlike the shock absorber disclosed in EP-A-0268608—it is not limited to only two positions in both directions: hard and soft damping.

Yet another object is that the initial stressing force for the shock absorber valves can be applied uniformly over the entire periphery.

SUMMARY OF THE INVENTION

To this end, according to the invention, the single-tube shock absorber is characterized in that an exciting chamber, bounded by a stationary disc, a piston skirt which can be slid around such a disc, and two spring-loaded plates, is situated on either side of the piston, in that said exciting chambers are in communication with a bore in which the pressure is controlled by a control mechanism, and in that bores by way of which fluid can flow into the exciting chambers are provided in said stationary discs.

It is preferable for each set of spring-loaded plates to be clamped near the piston rod and for the shock absorber valve to rest with initial stress against an edge of a piston skirt.

In order to avoid undesirable leaks in the exciting chambers, each exciting chamber can be divided into two parts by two spring-loaded plates, which spring-loaded plates grip with their outside edge around a radial edge of a piston skirt and at their inside edge are clamped near the piston rod, while of the said two spaces the space facing the shock absorber valve is connected by way of a narrow radial passage to the space surrounded by the cylinder.

If no excess pressure is present in the exciting chambers, it is preferable for the piston skirts not to exert initial stressing forces on the shock absorber valves.

The control mechanism can be in various embodiments. For example, the mechanism can comprise a valve which is adjustable by a coil and which can continuously vary the pressure in the central bores in proportion to the electric current to be sent through the coil. The valve to be adjusted by a coil can be a piston valve of the type shown in FIG. 2 of the international patent application PCT/NL95/00408. Another possibility is that the valve to be adjusted by a coil is a metal diaphragm. This embodiment is described per se in the abovementioned international patent application PCT/NL95/00408, in connection with FIG. 3.

In view of the simplicity and the low price, it can be highly preferable for the control mechanism to comprise a movable mass which is fitted in a spring-loaded manner above the piston, and is linked to the piston rod and controls the passage of fluid to a bore which is in communication with the exciting chambers.

BRIEF DESCRIPTION OF THE DRAWINGS

The invention will be explained in greater detail with reference to the four figures each showing—in section—an exemplary embodiment of the invention.

DETAILED DESCRIPTION OF PREFERRED EMBODIMENTS

Figure 1:
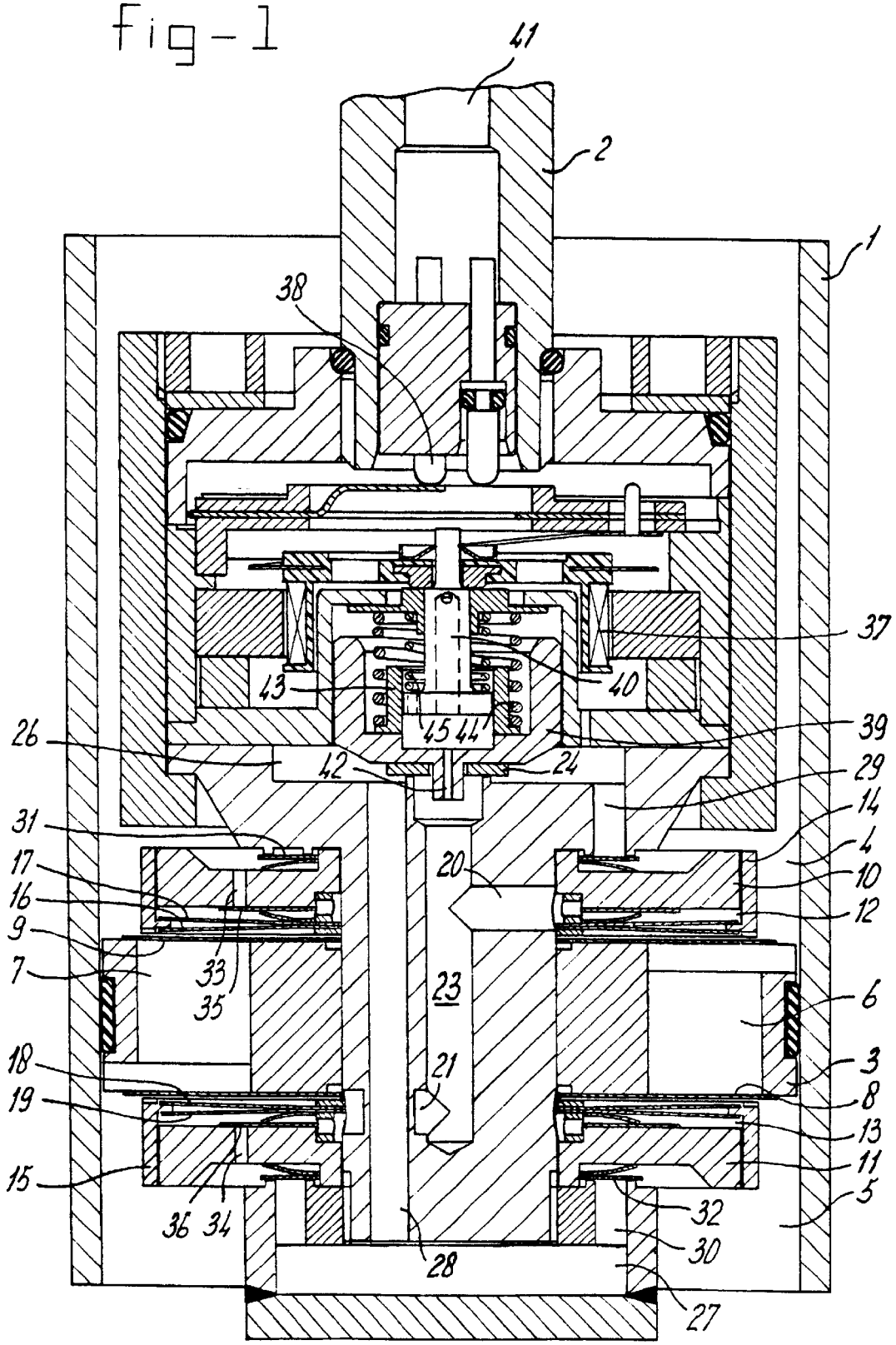

The continuously variable single-tube shock absorber shown in FIG. 1 comprises a working cylinder 1, a piston rod 2, a piston 3 which is connected to the piston rod and divides the cylinder space into two chambers 4 and 5, between which there are pressure differences, resulting from piston movements and causing the damping forces, bores 6 and 7 provided in the piston 3, spring-loaded valves 8 at one side of the bores 6, in the case of which shock absorber fluid flows downwards along the spring-loaded valves 8 when the piston 3 is moved upwards, spring-loaded valves 9 at one side of the bores 7, in the case of which shock absorber fluid flows upwards along said spring-loaded valves 9 when the piston is moved downwards, stationary discs 10, 11 on either side of the piston 3, two exciting chambers 12, 13 which are bounded by a stationary disc 10, 11 respectively, piston skirts 14 and 15, spring-loaded plates 16, 17 and 18, 19 respectively which lie with initial stress against an edge of a piston skirt 14, 15 respectively, bores 20, 21 which place the exciting chambers 12, 13 respectively in communication with a central bore 23, a piston valve 24 disposed at the top side of the central bore 23, two chambers 26, 27 cut out on either side of the piston 3, a channel 28 for placing said chambers 26, 27 in open communication with each other, outflow apertures 29, 30 which are in communication with the chamber 26, 27 respectively, essentially resistanceless non-return valves 31, 32 for covering the outflow apertures 29, 30 respectively, bores 33, 34 disposed in the fixed discs 10, 11 respectively, spring-loaded plates 35, 36 for covering the bores 30, 34 respectively, in the case of which damping fluid can flow into the exciting chambers 12, 13 respectively along said plates 35, 36 respectively, an electrically excitable coil 37, contact pins 38 by means of which electric current can be conducted to the coil 37, a control piston 39, a slide 40, an electric cable 41, an axial opening 42 in the control piston 39, and a cylinder 43 disposed inside the control piston, in order to load the cylinder 43 or the slide 40, and coil springs 44 and 45.

The embodiment according to FIG. 1 works as follows:

If the piston rod 2 moves upwards at increasing speed, the damping fluid will flow at increasing speed by way of the bore 33, the exciting chamber 12 and the bores 20, 21, 23 to the exciting chamber 13, before lifting the spring-loaded shock absorber valves 8 of the piston 3. The pressure in the exciting chamber 13 will increase and the piston skirt 15 is moved to the spring-loaded valve 8, so that initial stressing forces are exerted on said valve 8. The damping fluid can be discharged by way of the bore 23 if the valve 24 of the control mechanism is easily opened. This is the case if the coil 37 is excited and the pressure in the chamber above the control piston 39 is kept as low as possible, through the fact that the slide 40 has been opened as much as possible.

The pressure in the exciting chamber 13 will not be able to increase in this situation. The piston skirt 15 will not be able to move to the spring-loaded valve 8, because the rigidity of the spring-loaded shock absorber valves 18, 19 prevent it.

The valve 24 can open easily, without causing a large flow or opening resistance. As a result of this, with increasing piston speed little damping force will be built up.

However, if the coil 37 fully or partially closes the slide 40, pressure can build up in the bores 23 and 21. The result of this is that the piston skirt 15 moves against the rigidity of the spring-loaded plates 18 and 19. In the course of this, initial stressing force is built up on the valve 8. If the throughflow resistance increases as a result, the pressure above the piston 3 will increase even further. More fluid can then flow in by way of the bore 29, the exciting chamber 12, and the bores 20 and 23. The excitation of the valve 24 increases, with the result that the pressure in the spaces 22, 21 and 12 will increase, so that an even greater initial stressing force is built up on the valve 8, resulting in even more damping pressure on the piston 3 etc.

The excitation and the speed at which the damping force increases depends on the inflow resistance in the bores 33 and 34, and on the speed at which the valve 24 reacts to the control current through the coil.

If the piston 3 moves downwards, shock absorber fluid will flow through the bores 34, 21, 22, 20 to the exciting chamber 13. When the pressure build-up in the exciting chamber 13 and the central bore 23 becomes possible through the control valve 24, in which case the valve 24 remains provisionally closed, the piston skirt 14 will move to the shock absorber valve 9, and the initial stressing forces will be exerted upon the valve 9. The pressure drop over the piston 3 will consequently increase, and even more fluid will flow through the abovementioned spaces 34, 21, 22 and 20. The pressure can consequently rise further, as a result of which an even greater pressure drop occurs over the piston 3 etc.

This control circuit is broken if the control valve 24 is opened, either through excitation of the coil 37, in which case the exciting pressure behind the valve 24 is reduced or falls to zero, or through the fact that the pressure in the central bore 23 goes above the control pressure in such a way that the balance of the valve 24 is upset and the valve is simply opened. In both cases liquid flows away out of the exciting chamber 12 and the central bore by way of the chamber 26 to the low-pressure side of the cylinder 1.

The control pressure maintained or increased or reduced by the valve 24 in the bore 23 is thus dependent, on the one hand, on the quantity and the pressure of the fluid entering through the bores 34 or the exciting chamber 12 and, on the other hand, on the control valve mechanism 24, 27, 39 and the control current exerted thereon. Such a mechanism is described per se in the international patent application PCT/NL95/00408, FIG. 2, although in that case it concerns the bottom valve of a twin-tube shock absorber.

The construction described has the advantage that during assembly of the parts the initial stressing force can be applied uniformly over the entire periphery, that the exciting piston can, but does not have to, rest against the valves concerned, and that the initial stressing force can be regulated in proportion to the input current. As a result of the use of an additional servo system, the control pressure can be regulated over a large pressure range. The construction is also advantageous through the fact that conventional piston and valve systems are used.

Figure 2:
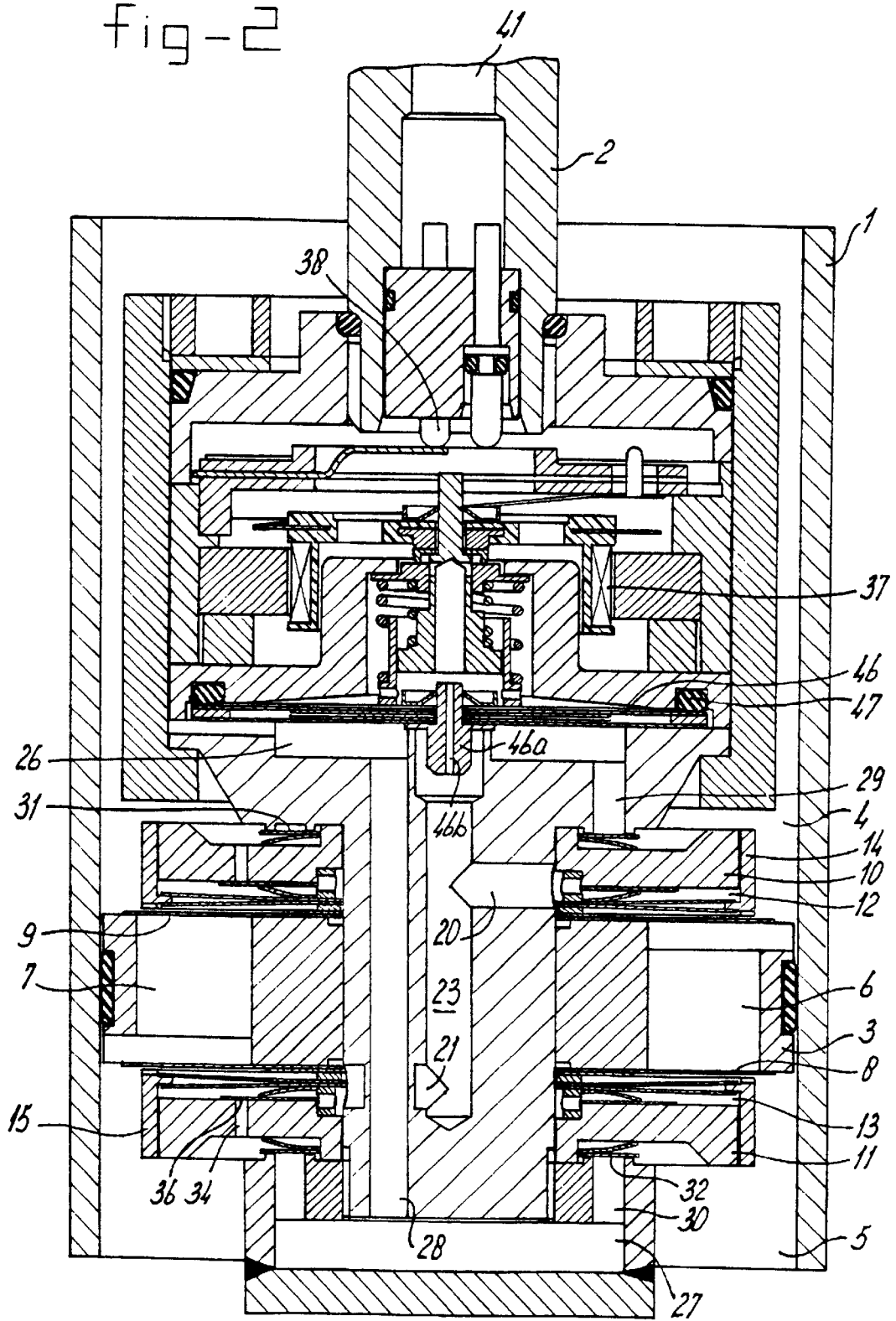

The difference between the embodiment according to FIG. 1 and that according to FIG. 2 is that a diaphragm valve is used instead of the valve mechanism 37, 38. 39, 40, 42, 43, 44 and 45 according to FIG. 1. Said diaphragm valve is described per se in the abovementioned international patent application PCT/NL95/00408, in connection with FIG. 3.

The diaphragm is indicated by 46, a centering pin by 46a, an axial passage by 46b, and an O-ring by 47.

In both the embodiment of the servo valve according to FIG. 1 and that according to FIG. 2 in the event of failure of the control system or wire breakage in the control circuit cables, a failsafe position in which the average damping force is set is present. This is an advantage compared with the known systems which, if they have a failsafe system, revert to the strongest damping position, which will lead to the vehicle no longer being entirely safe to drive.

Figure 3:
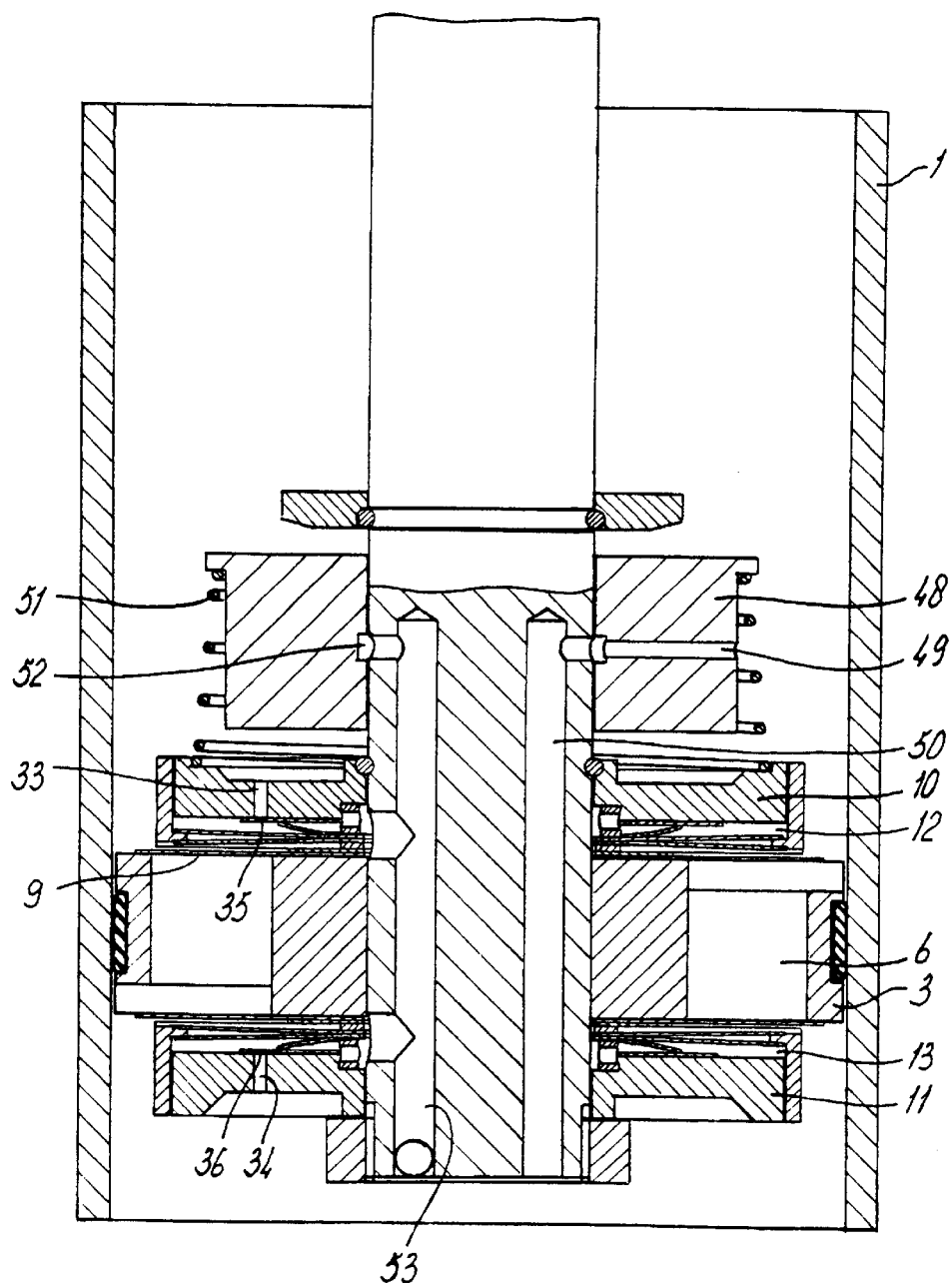
Figure 4:
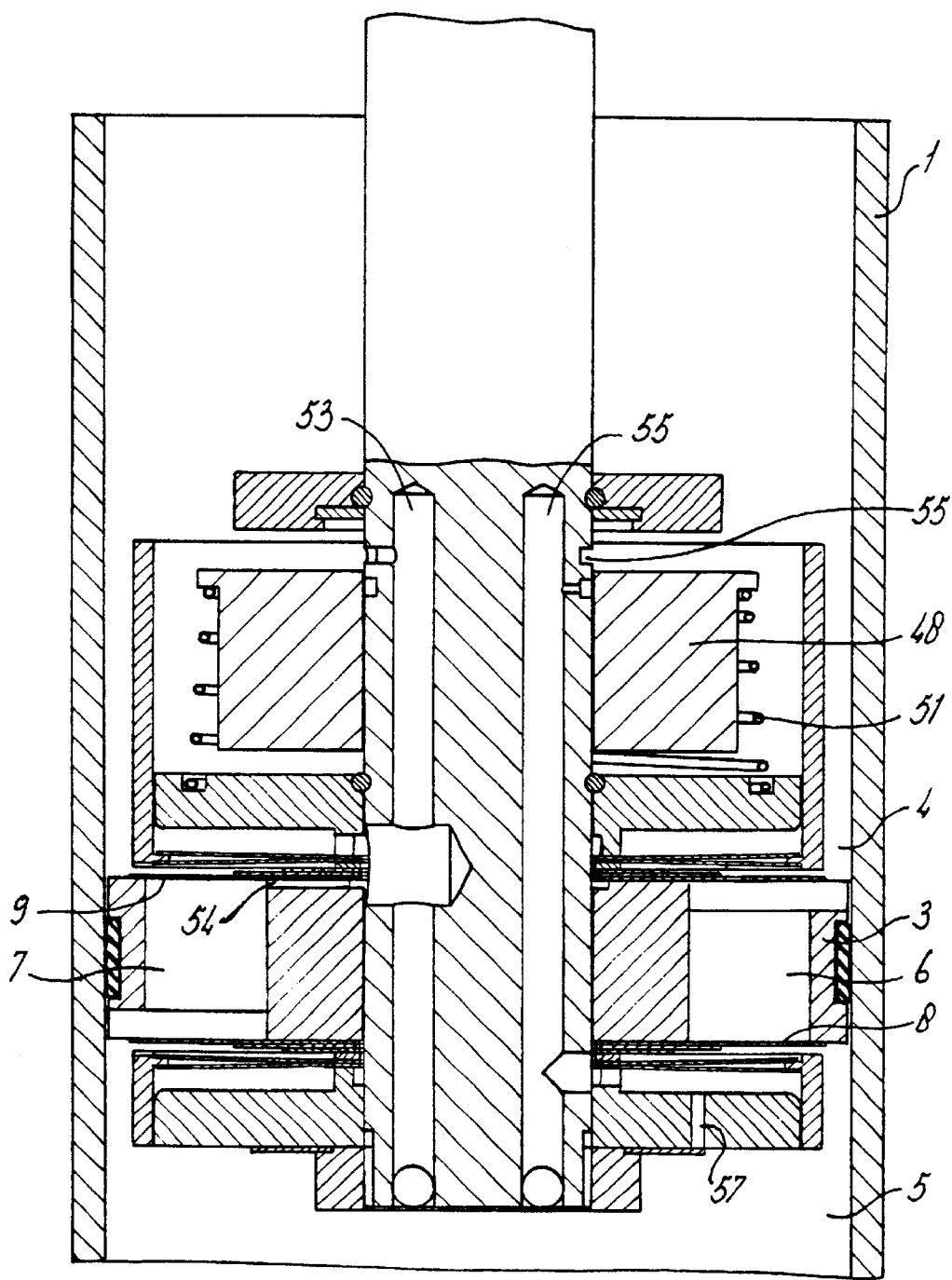

In the embodiments according to FIGS. 3 and 4 the same excitation is used, but it is controlled by a mass 48 suspended in such a way that it is freely movable at the top side of the piston 3. As in the case of the previous two embodiments, the skyhook suspension is also possible in this case. While in the case of the construction according to FIGS. 1 and 2 the signals from one or more acceleration recorders are processed by an ECU in such a way that damping occurs only if there is compliance with the basic rule that the absolute speeds of body and wheels are in opposite directions and the difference is greater than 0, in the embodiment according to FIGS. 3 and 4 the control is made dependent on a spring-loaded mass linked to the body or to the shock absorber part (piston rod) attached to the body, in which case there is automatic compliance with the skyhook basic rule. In addition, the damping force is regulated in proportion to the degree of deflection of the mass 48, which is a measure of the acceleration on the body. In principle, the mass-inertia-controlled shock absorber is thus controlled like an electronically controlled skyhook shock absorber. The same exciting mechanism is therefore still used.

In FIGS. 3 and 4 the mass is shown by 48, a chamber by 49, a bore by 50, a spring by 51, a chamber by 52, a channel by 53, an opening by 54, a chamber by 55 and an annular chamber by 56. Parts which are the same as parts of the embodiments according to FIGS. 1 and 2 have been given the same reference numbers.

If in the embodiment shown in FIG. 3 the piston 3 is moved slowly upwards as the result of a very slight acceleration of the body, damping fluid will flow by way of channel 49 and bore 50 into the space below the piston 3. With increasing speed, the fluid will also flow through the bore 6 and the valve 8. Since no exciting pressure is yet present in the exciting chamber 13, the valves 8 remain unexcited and the damping force will be low. With increasing acceleration of the body, the control mass 48 will lag behind and compress the spring 51 slightly, in which case the chamber 52 will slide away, and the supply openings to channel 53 and channel 50 will be shut off. The greater the acceleration, the higher the throughflow resistance through channel 53 and channel 50 to the cylinder 1, and vice versa. Fluid will now flow through bores 33 to channel 53 and on to chamber 13, as a result of which the pressure in the chamber 13 can rise and the skirt 15 will move to the valves and subsequently excite said valves. Decreasing the acceleration or reversing the direction of the acceleration will return the mass 48 there, with the result that the fluid entering at 33 by way of channels 53, 52 and 49 flows essentially resistanceless to the space below the piston 3. The pressure in the exciting chamber 13 will decrease or fall off completely, so that the damping force also decreases. The same control process occurs when the piston goes down. When the acceleration of the body increases, the spring 51 will be released slightly. The mass slides upwards over the rod and again shuts off the channel 53 and the channel 50. The fluid can now place the exciting chamber 12 under pressure by way of opening 34 and channel 53, as a result of which the inward damping pressure drop over the piston 3 is increased. With decreasing acceleration and sliding back of the mass 48, the fluid flowing in by way of bore 30 will flow by way of channel 52 and channel 49 to the low-pressure side of the piston 3, and the excitation of the shock absorber valve 9 will decrease or cease. Both during inward and outward movement, the damping is controlled by one mass, and the control is achieved by bringing the chambers 12, 13 to pressure in the same way as in the case of the constructions according to FIGS. 1 and 2.

The difference between the embodiment according to FIG. 4 and that according to FIG. 3 is that the single control mass either shuts off the discharge of the inward exciting fluid to a greater or lesser extent or opens the supply of the outward exciting circuit. On downward movement of the piston 3, fluid flows through the bore 6, the recess 54, by way of channel 53 to the low-pressure side of the piston. When the mass 48 slides upwards over the piston rod, the chamber 55 is shut off to a greater or lesser extent, with the result that the pressure in exciting chamber 12 will increase and the valve 9 will be excited.

On upward movement of the piston 3, the chamber 13 will come to pressure when the mass 48 slides downwards. Fluid then flows out of the annular chamber 56 to the bore 50 and the exciting chamber 13. This fluid can flow by way of channel 57 and a non-return valve to the low-pressure side of the piston 3. In this circuit pressure can be built up in exciting chamber 13 only if the outflow resistance of channel 57 exceeds the inflow resistance in channel 50, which can be achieved by providing suitable dimensions of the inflow and outflow bores.

In the purely mechanical control of the device according to FIG. 3 the following situations can occur:

A. The wheels move upwards and the body stands still. This means that the piston rod and the mass 48 also stand still. The wheels move upwards, so that the cylinder 1 also moves upwards. The oil 5 below the cylinder 3 moves upwards and passes up through the piston, and the exciting mechanism does not go into operation, since the mass 48 stands still. The oil flows freely out of the space below the piston 5 to the space 4 above the piston. Only the unexcited valve 9 need be opened. There is a danger of the wheel coming off the ground. The valve 9 must deliver a certain spring-loaded resistance in order to keep the wheels on the road.

B. The wheels move downwards and the body stands still. The mass 48 also stands still. The oil flows from the space 4 above the piston to the space 5 below the piston. Only an unexcited valve 8 is opened. This is necessary for making the wheel move quickly back downwards into the initial position.

C. The wheels stand still and the body comes down. Oil flows from the space 5 below the piston to the space 4 above the piston, but the mass 48 remains behind on downward movement of the piston rods. The leak channel 49 and the chamber 52 are shut off. This means that all oil flows through the bores 7 and 9. The slight resistance of the bore 7 is sufficient to create the pressure drop over the entire working piston. As an example, in the initial situation the pressure above and below the piston is 25 bar, and in the new situation the pressure above the piston is 24 bar and below the piston is 25 bar. There is thus only a pressure drop of 1 bar. Oil flows by way of the channel 34 and lifts the valves 36. The oil goes into the exciting chamber 13 and flows from there to the channel 53, and then into the exciting chamber 12. The oil cannot flow through the bores 33, on account of the valve below the outflow opening 29. The pressure is now, for example, 25 bar in the exciting chamber 12, and 24 bar in the space above the piston. The annular piston 14 slides downwards, in which case the disc 10 is stuck. The valve 9 is excited, so that a higher damping force is achieved. The difference in pressure is, for example, 25–10 bar. At an even higher damping force, too much damping occurs, and the acceleration of the body decreases. The channels 52, 59 go into line with the channels 53, 50. Pressure equalization then occurs, as a result of which the old situation returns (pressure 25 bar).

D. The wheels stand still and the body goes upwards. Oil flows from the top downwards. The piston 3 goes upwards in an accelerated manner. The mass 48 remains behind, and the bores 52 and 49 are shut off. The oil flows from the top by way of the bore 33 into exciting chamber 12. The oil also flows through the bore 53 to the exciting chamber 13. The bore 34 is shut off. The annular piston 15 moves up and the pressure below the piston remains 25 atmospheres. The pressure above the piston is, for example. 40 atmospheres. Excitation occurs in this case. Finally, the channel 49 goes into communication with the channels 53 and 50, with the result that pressure equalization occurs. The mass 48 is in fact an acceleration sensor.

In the embodiment according to FIG. 4, the throughflow is slightly different. The valves on the bores 34 and 33 have disappeared. When the body moves down and the wheels stand still, the weight 48 remains behind and thus moves up relative to the piston rod. The annular chamber 55 has been shut off by the weight. Liquid flows through the cylinder chamber, the opening 54, and the channel 53 to the exciting chamber 12. Pressure is thus built up, with the result that the valve 9 is excited.

When the body moves up and the wheels stand still, the weight 48 remains behind and thus moves down relative to the rod. The groove 56 opens, with the result that a communication is produced between the space above the piston 4 and the channel 22. Oil flows into the exciting chamber 13, in which case pressure is built up. There is a flow restriction by way of the hole 57, and the valve below it opens. The dimensions of the channels 56 and 57 determine the pressure in the exciting chamber 13.

What is claimed is:

1. Continuously variable single-tube shock absorber with bidirectional control valves, comprising:

a working cylinder;

a piston which is connected to a piston rod and is movable in the working cylinder;

openings cut out in the piston;

spring-loaded shock absorber valves fitted on either side of the piston, in order to shut off said openings until a certain fluid pressure has been reached;

exciting chambers situated on either side of the piston, each bounded by a stationary disc, a piston skirt which can be slid around said disc, and two spring-loaded plates;

wherein said exciting chambers are in communication with a communicating bore in which the pressure is controlled by a control mechanism;

wherein said communicating bore through which fluid can flow into the exciting chambers are provided in said stationary disc; and wherein each spring-loaded plate is clamped near the piston rod and rests with initial stress against an edge of said piston skirt.

2. Shock absorber according to claim 1, wherein each exciting chamber is divided into two spaces by two spring-loaded plates, which spring-loaded plates grip with their outside edge around a radial edge of a piston skirt, and at their inside edge are clamped near the piston rod, while of the said two spaces the space facing the shock absorber valve is connected by way of a narrow radial passage to the space surrounded by the cylinder.

3. Shock absorber according to claim 1, wherein if no excess pressure is present in the exciting chambers, the piston skirt does not exert initial stressing forces on the shock absorber valves.

4. Shock absorber according to claim 1, wherein the communicating bore is a central bore.

5. Shock absorber according to claim 9, wherein the control mechanism comprises a movable mass which is fitted in a spring-loaded manner above the piston, and is linked to the piston rod and controls the passage of fluid to said communicating bore which is in communication with the exciting chambers.

6. Continuously variable single-tube shock absorber with bidirectional control valves, comprising:

a working cylinder;

a piston which is connected to a piston rod and is movable in the working cylinder;

openings cut out in the piston;

spring-loaded shock absorber valves fitted one either side of the piston, in order to shut off said openings until a certain fluid pressure has been reached;

exciting chambers situated on either side of the piston, each bounded by a stationary disc, a piston skirt which can be slid around said disc, and two spring-loaded plates;

wherein said exciting chambers are in communication with a central bore in which the pressure is controlled by a control mechanism;

wherein said communicating bore through which fluid can flow into the exciting chambers are provided in said stationary disc; and wherein the control mechanism comprises valves which are adjustable by a coil and which can continuously vary the pressure in the central bore in proportion to an electric current to be sent through the coil.

7. Shock absorber according to claim 6, wherein the valve to be adjusted by a coil is a piston valve.

8. Shock absorber according to claim 6, wherein the valve to be adjusted by a coil is a metal diaphragm.

* * * * *

UNITED STATES PATENT AND TRADEMARK OFFICE
CERTIFICATE OF CORRECTION

PATENT NO.    : 6,264,015 B1
DATED         : July 24, 2001
INVENTOR(S)   : Cornelis De Kock It is certified that error appears in the above-identified patent and that said Letters Patent is hereby corrected as shown below:

Column 6,
Line 65, "said communicating bore" should read -- disc bores --.

Column 7,
Line 18, "claim 9" should read -- claim 1 --.
Line 22, "said communicating bore" should read -- disc bore --.

Column 8,
Line 4, "one" should read -- on --.
Line 14, "said communicating bore" should read -- disc bores --.

Signed and Sealed this

Eighteenth Day of June, 2002

*Attest:*

JAMES E. ROGAN
*Director of the United States Patent and Trademark Office*

*Attesting Officer*